Figure 2:
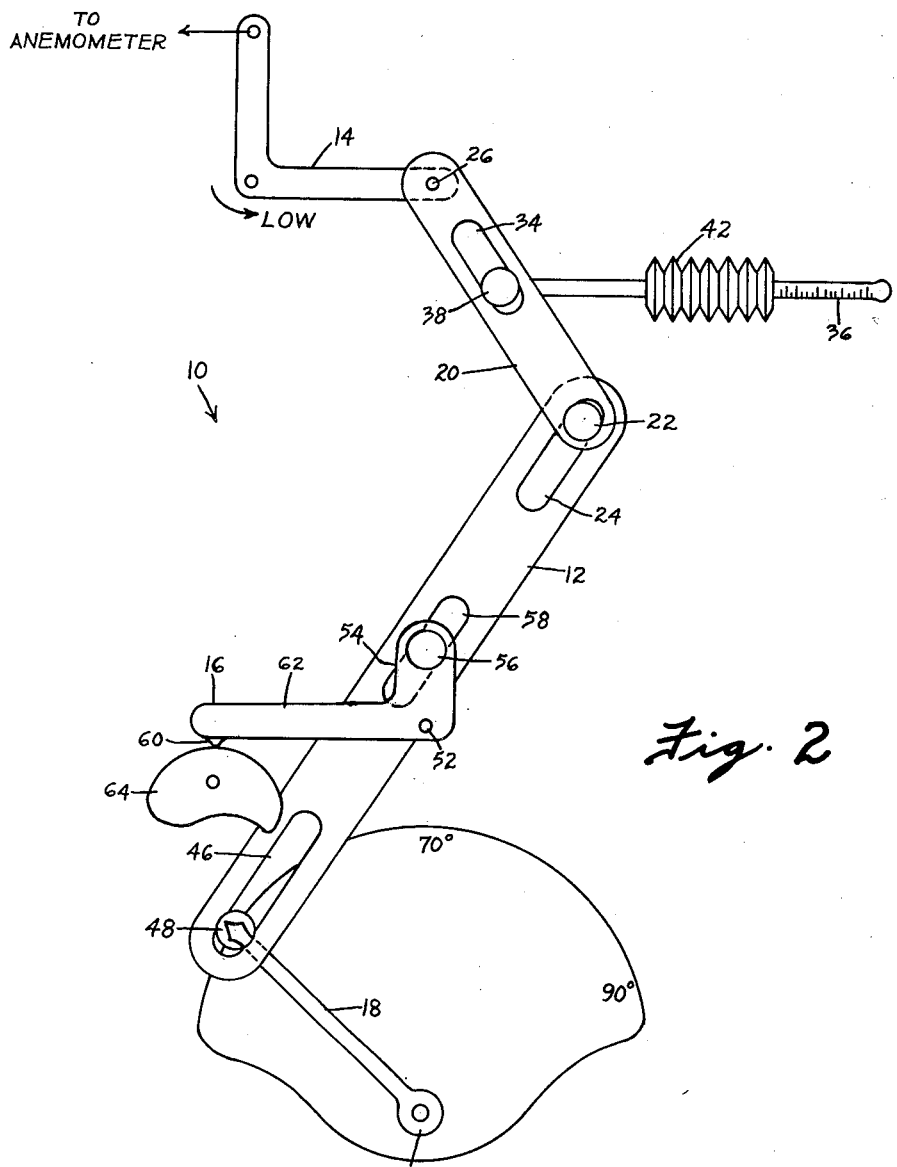

Jan. 22, 1957 A. MURDOCH, JR 2,778,572
TEMPERATURE REGULATOR
Filed Dec. 23, 1953 2 Sheets-Sheet 1
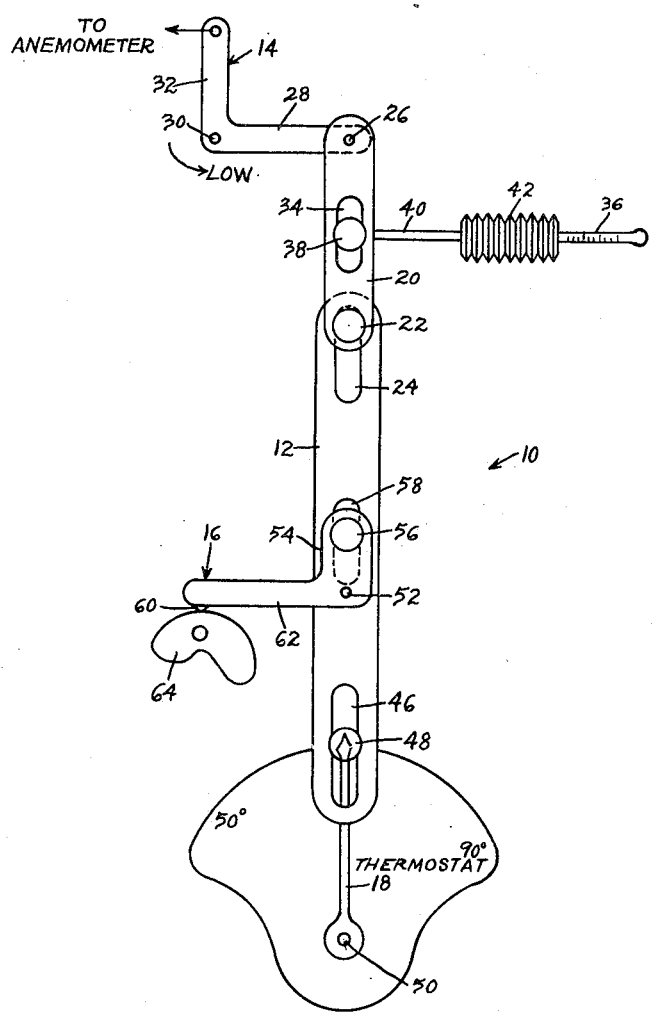
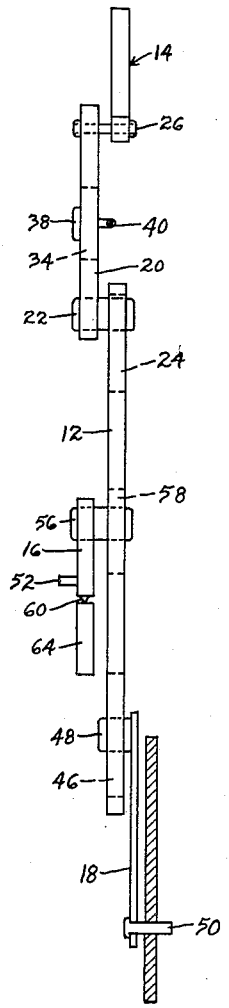
Fig. 1
Fig. 3
INVENTOR
ALEXANDER MURDOCH, Jr.
BY R. I. Tompkins
ATTORNEYS 2,778,572
Patented Jan. 22, 1957

2,778,572

TEMPERATURE REGULATOR

Alexander Murdoch, Jr., Port Washington, N. Y.

Application December 23, 1953, Serial No. 400,156

3 Claims. (Cl. 236—46)

(Granted under Title 35, U. S. Code (1952), sec. 266)

The invention described herein may be manufactured and used by or for the Government of the United States of America for governmental purposes without the payment of any royalties thereon or therefor.

The invention relates to a device that is sensitive to various temperature conditions and is capable of integrating these factors to regulate a heating system so as to provide a constant, predetermined temperature at all times.

There are many devices intended to provide a uniform temperature in a building which respond to variations in heat, wind, etc. Some of these devices attempt to combine several of the factors involved to more accurately control a uniform temperature. Patent Number 2,044,127, issued to H. J. Smith, is illustrative of the latter type. As is apparent from the patent, complicated electro-mechanical means must be employed to obtain the desired results. The present invention avoids the use of complicated structures and relies upon simple mechanical linkages to achieve the same results.

A primary object of the invention is to provide a constant, predetermined temperature in a building.

Another object of the invention is to integrate the various external conditions to provide a uniform temperature.

Yet another object of the invention is to provide a mechanically operated device that will control the heating means to provide a constant temperature.

Still another object of the invention is to provide a device that will be time controlled to maintain desired temperatures during the different periods of day and night.

It is yet another object of the invention to provide a simple structure wtih a minimum of parts and one which is therefore economical to manufacture and install.

Other objects and many of the attendant advantages of this invention will be readily appreciated as the same becomes better understood by reference to the following detailed description when considered in connection with the accompanying drawings wherein:

Fig. 1 is a side elevation of the regulator of the invention and illustrates the device in the assumed position when a desired temperature exists, Fig. 2 is a side elevation of the regulator illustrating the device in operating position when the temperature is low, and Fig. 3 is an end view of the apparatus of Figure 1.

Referring to the figures, the integrator of the invention 10 comprises a control arm 12 operatively connected to a wind bell crank lever 14 and a time bell crank lever 16. Thermostat 18 is secured in arm 12 and controls the supplied heat on the deflection of the needle. Thermostat 18 represents the conventional temperature control means located at a fixed location, with the bi-metallic elements controlling an electrical circuit so that when the temperature falls below the indicated position on the scale, fuel is supplied to again raise the temperature. As this structure is conventional, it is not illustrated or further described. Temperature link 20 is slidably and pivotally connected to control arm 12 by means of a projecting pin or rivet 22 extending into lost motion slot 24 on the upper end of arm 12. Link 20 is pivotally secured at 26 to the horizontal leg 28 of bell crank lever 14. Lever 14 is secured to any suitable support means by fixed pivot 30. The vertical leg 32 is operatively connected with a means for indicating the wind velocity, such as an anemometer (not shown). Obviously, actuation of bell crank lever 14 will move control arm 12 by causing pins 22 and 26 to rotate link 20 about pivot point 38.

A lost motion slot 34, intermediate the length of link 20 is operatively connected to a temperature indicating means, such as a bulb or thermometer 36. Thermometer 36 is adapted to control link 20 through sliding movement of a pivot pin or rivet 38 extending into slot 34. Pivot 38 is secured to the free end of a cable or rod 40, in turn secured to a coil or bellows 42 adapted to expand or contract, according to the temperature. Such expansible bellows are common and are illustrated in the above-mentioned patent to Smith. Rod 40 extends into slot 34 in link 20.

Thermostat slot 46 is provided at the opposite end of control arm 12 and retains therein a pivot pin or rivet 48 extending from thermostat needle 18. Needle 18 is secured to a thermostat actuating control shaft by means of a fixed pivot 50 so that movement of arm 12 moves thermostat 18 to control the source of heat.

Time lever 16 is also in the form of a bell crank lever and is pivotally fixed at 52 to some external support. Vertical leg 54 contains a pin or rivet 56 slidable in an intermediate slot 58 in control arm 12. An extension or projection lip 60, depending from the horizontal leg 62 of lever 16 is adapted to ride on the surface of a day-night cam 64 driven by means of a clock mechanism (not shown).

The operation is readily apparent. Thermostat 18 is set for the usual desired temperature by any suitable remote control means. Normally, this will be for 70° F. Assuming there is a drop in the outdoor temperature, bellows 42 contracts and withdraws rod 40 causing pin or rivet 38 to slide in slot 34 and to pivot link 20 about pivot pin 26. Rivet 22, on link 20, in turn pivots control arm 12 about pin 56 to the position illustrated in Figure 2, moving thermostat needle 18 to rotate the shaft 50. Rotation of this shaft is intended to reposition the actual furnace control to cause it to operate and supply heat as though the room temperature were actually lower than the room thermometer indicates. This outdoor temperature control thus avoids the time lag and causes heat to be supplied when the outdoor temperature drops rather than waiting for the building to cool inside as a result of the drop in outside temperature.

Wind velocity affects the radiation rate and this in turn causes the building to cool faster on a windy day than on a calm day when the weather is cold. Therefore, the wind lever 14 is employed to additionally regulate the indoor temperature in accordance with the varying wind conditions. The wind lever 14 is used to compensate for wind forces. Assuming a low wind velocity exists, there will be a smaller heat loss due to radiation, and as a result, less heat will be required. Actuated by the anomometer, lever 14 in Fig. 2 pivots in the direction of the arrow, causing link 20 to slide and pivot about pin 38. This moves pin 22 to the left and produces counterclockwise rotation of arm 12 about pivot 56. This action tends to move arm 18 clockwise toward a more nearly vertical position.

Time lever 16 is used when it is desired to maintain a lower temperature at night. Lever 16 is then operatively connected to a twenty-four hour cam 64 of a timing clock. The cam has the usual high and low surfaces, one for day temperature and the other for night temperature. The position of cam 64 directly controls the angular position of lever 16 about fixed pivot 52. Rotation of the lever about pin 52 in a clockwise direction will cause pin 56 to move to the right. This will produce counter-clockwise rotation of arm 12 about the pin 22, resulting in clockwise movement of arm 18 through the medium of pivot pin 48.

The device is adapted for many uses where temperatures are to be maintained with a minimum of fluctuation. It is readily adapted for use in laboratories, in factories or in the home. The simplified structure avoids mechanical failure and is readily installed.

Obviously many modifications and variations of the present invention are possible in the light of the above teachings. It is therefore to be understood that within the scope of the appended claims the invention may be practiced otherwise than as specifically described.

What is claimed is:

1. A temperature regulator comprising, control means, thermostat means engaging said control means and actuated thereby, temperature responsive means, means connecting said temperature responsive means and control means to actuate the latter, said connecting means comprising a link-member, an elongated slot in said link member, and a connecting element secured to said temperature responsive means and in said slot to actuate the control means and wind responsive means secured to the connecting means to actuate said control means, said wind responsive means including a bell-crank lever connected to an anemometer, one leg thereof being pivotally secured to said link member, and said link member being pivotally secured to said control means to integrate the temperature and wind conditions.

2. A temperature regulator comprising a control arm, a slot on each end of said control arm, thermostat means pivotally retained in one of said slots, a link member pivotally secured in the other slot, a slot intermediate the length of said link member, temperature responsive means including a rod, said rod being pivotally retained in said last named slot, and an anemometer actuated bell crank lever pivotally secured at one end to said link member, said link member integrating the temperature and wind conditions to actuate the control arm.

3. The combination of claim 2 wherein said control arm includes an intermediate slot, and a time controlled lever engaging said intermediate slot to vary the position of the thermostat means for selected periods of time.

References Cited in the file of this patent

UNITED STATES PATENTS

| | | |
|---|---|---|
| 1,499,278 | Wingfield | Jan. 24, 1924 |
| 2,012,285 | Otis | Aug. 27, 1935 |
| 2,044,127 | Smith | June 16, 1936 |
| 2,060,265 | Thomas | Nov. 10, 1936 |
| 2,063,613 | McCarthy | Dec. 8, 1936 |
| 2,068,663 | Diehl | Jan. 26, 1937 |
| 2,255,639 | Annin | Sept. 9, 1941 |
| 2,376,664 | Crise | May 22, 1945 |
| 2,468,288 | Booth | Apr. 26, 1949 |
| 2,534,251 | Dillman | Dec. 19, 1950 |